US010608816B2

(12) United States Patent
Pizano et al.

(10) Patent No.: US 10,608,816 B2
(45) Date of Patent: Mar. 31, 2020

(54) AUTHENTICATION SYSTEM FOR ENHANCING NETWORK SECURITY

(75) Inventors: Erix Pizano, Tampa, FL (US); Kass Aiken, Oldsmar, FL (US)

(73) Assignee: Ceelox Patents, LLC, Overland Park, KS (US)

( * ) Notice: Subject to any disclaimer, the term of this patent is extended or adjusted under 35 U.S.C. 154(b) by 1149 days.

(21) Appl. No.: 13/549,967

(22) Filed: Jul. 16, 2012

(65) Prior Publication Data

US 2012/0304270 A1    Nov. 29, 2012

Related U.S. Application Data

(63) Continuation of application No. 12/913,126, filed on Oct. 27, 2010, now Pat. No. 8,225,384, which is a
(Continued)

(51) Int. Cl.
*H04L 9/32* (2006.01)
*H04L 29/06* (2006.01)

(52) U.S. Cl.
CPC .......... *H04L 9/3213* (2013.01); *H04L 9/3231* (2013.01); *H04L 63/0861* (2013.01); *H04L 63/0428* (2013.01)

(58) Field of Classification Search
CPC . H04L 9/3213; H04L 9/3231; H04L 63/0861; G06F 21/10; G06F 21/33
See application file for complete search history.

(56) References Cited

U.S. PATENT DOCUMENTS

| | | | |
|---|---|---|---|
| 5,648,648 A * | 7/1997 | Chou | G07C 9/00158 235/375 |
| 5,666,400 A * | 9/1997 | McAllister | G10L 15/25 379/189 |

(Continued)

FOREIGN PATENT DOCUMENTS

| | | | | |
|---|---|---|---|---|
| WO | WO 9704375 A3 * | 7/1997 | | G06F 21/32 |
| WO | WO 9858346 A1 * | 12/1998 | | G06F 3/03547 |

OTHER PUBLICATIONS

IBM Unveils First Biometric ThinkPad, Offering Security at Your Fingertips. Oct. 4, 2004. IBM News Release.*
(Continued)

*Primary Examiner* — Khalil Naghdali
(74) *Attorney, Agent, or Firm* — Erise IP, P.A.

(57) ABSTRACT

A network-based biometric authentication system includes a client computer (10), a third party server (24), and a biometric authentication server (26). A user requests access to a web site hosted by the third party server via the client computer, wherein the third party server communicates a deployable object to the client computer. The client computer executes the deployable object, wherein the object enables the client computer to receive a user name, password, and biometric data from the user and to communicate the user name, password, and biometric data to the biometric authentication server in a secure fashion. The biometric authentication server authenticates the user name, password, and biometric data, and communicates the user name and password to the third party server, which attempts to verify the user name and password in a conventional manner and grants access to the user if the user name and password are verified.

7 Claims, 4 Drawing Sheets

Related U.S. Application Data continuation of application No. 11/279,715, filed on Apr. 13, 2006, now abandoned.

(56) References Cited

U.S. PATENT DOCUMENTS

| | | | | |
|---|---|---|---|---|
| 6,148,094 | A * | 11/2000 | Kinsella | G06F 3/03549 345/167 |
| 2001/0027527 | A1 * | 10/2001 | Khidekel | G06F 21/32 726/9 |
| 2002/0010679 | A1 * | 1/2002 | Felsher | G06F 19/322 705/51 |
| 2004/0083215 | A1 * | 4/2004 | de Jong | G06F 21/10 |
| 2007/0044143 | A1 * | 2/2007 | Zhu | G06F 21/33 726/8 |
| 2007/0245152 | A1 * | 10/2007 | Pizano | H04L 63/0861 713/186 |
| 2010/0223663 | A1 * | 9/2010 | Morimoto | G06F 21/32 726/7 |
| 2010/0287369 | A1 * | 11/2010 | Monden | G06F 21/32 713/156 |

OTHER PUBLICATIONS

Jack Germain. IBM Introducing Fingerprint Reader into Laptop. Oct. 4, 2004. TechnewsWorld.*

Wei G., Li D. (2006) Biometrics: Applications, Challenges and the Future. In: Strandburg K.J., Raicu D.S. (eds) Privacy and Technologies of Identity. Springer, Boston, MA.*

* cited by examiner

AUTHENTICATION SYSTEM FOR ENHANCING NETWORK SECURITY

RELATED APPLICATIONS

This application is a continuation, and claims priority benefit with regard to all common subject matter, of U.S. patent application Ser. No. 12/913,126, filed Oct. 27, 2010, entitled "AUTHENTICATION SYSTEM FOR ENHANCING NETWORK SECURITY," which is now U.S. Pat. No. 8,225,384, issued Jul. 17, 2012 ("the '384 Patent). The '384 Patent is a continuation of U.S. patent application Ser. No. 11/279,715, filed Apr. 13, 2006, entitled "BIOMETRIC AUTHENTICATION SYSTEM FOR ENHANCING NETWORK SECURITY," which is now abandoned. The earlier-filed patent and patent application are hereby incorporated by reference in their entirety into the present application.

BACKGROUND OF THE INVENTION

1. Field of the Invention

The present invention relates to the field of computer security. More particularly, the present invention involves a system for transparently enhancing secure access to a network node by validating a user's identity using biometric data, wherein biometric authentication occurs on a biometric authentication server and the network node to which access is sought initiates the biometric authentication process.

2. Description of Prior Art

Providing secure Internet transactions has become increasingly important as use of the Internet for business, financial, and other sensitive transactions has become ubiquitous. Traditionally, network servers hosted by businesses have been programmed to require a user to submit identification information, such as a user name and a password, before allowing the user to access files managed by the server.

Use of such identification information renders the server susceptible to access by unauthorized users who obtain a valid user's identification information by, for example, intercepting network communications. Requiring a user's biometric data, such as a fingerprint, before granting the user access is known in the art and benefits from the added measure of security inherent in biometric authentication systems. For example, fingerprint data and other biometric data cannot be "stolen" as easily as a user name and password, and, even if stolen, cannot be used to circumvent security if the system requires the user to submit fresh biometric data via a biometric sensor.

While use of biometric data increases the security of computer networks, it also requires special hardware and software to implement. For example, fingerprint-based biometric authentication requires use of a fingerprint scanner, driver software for the scanner, and software for authenticating fingerprint data received via the fingerprint scanner. Authenticating the fingerprint data may include, for example, comparing the data with fingerprint data stored in a database to determine whether the received data matches the stored data. Thus, implementing a biometric authentication system can require significant hardware and software resources that, in some circumstances, render it impractical or even impossible to implement.

Accordingly, there is a need for an improved network security system that does not suffer from the problems and limitations of the prior art.

SUMMARY OF THE INVENTION

The present invention provides an improved biometric authentication system for network transactions. Particularly, the present invention provides a system for transparently enhancing secure access to a network node by validating a user's identity using biometric data, wherein biometric authentication occurs on a biometric authentication server and the network node to which access is sought initiates the biometric authentication process.

A first embodiment of the invention is a computer program for enabling a biometric authentication system, wherein at least a portion of the program is stored on a computer-usable medium. The computer program enables a first computer to receive biometric data and identification information from a user and to communicate the biometric data and the identification information to a second computer. The second computer creates a first transaction identifier, and verifies the identification information by confirming that the biometric data corresponds to at least a portion of the identification information.

The program further enables a third computer to communicate to the second computer a request for at least a portion of the identification information, wherein the request includes a second transaction identifier. The second computer communicates at least a portion of the identification information to the third computer if the first transaction identifier corresponds to the second transaction identifier and if the biometric data corresponds to at least a portion of the identification information.

According to a second embodiment of the invention, the program enables a first computer to communicate a deployable object to a second computer via a network communications medium, wherein the deployable object enables the second computer to generate a first token, to receive identification information and biometric data from a user, to bundle the biometric data with the token and secure the bundle, and to communicate the first token to the first computer and the bundle to a third computer.

The program enables the third computer to create a second token and to verify the first token received from the second computer by determining whether the first token corresponds to the second token, and enables the third computer to verify the biometric data received from the second computer by comparing the received data to biometric data stored in a database.

The third computer communicates the identification information received from the second computer to the first computer if the second token corresponds to the first token, if the received biometric data matches biometric data stored in the database, and if the biometric data corresponds to at least a portion of the identification information.

According to a third embodiment of the invention, the program enables a network server computer to communicate an ActiveX control to a network client computer via a network communications medium, wherein the ActiveX control enables the client computer to generate a first token, to receive a user name and password from the user, to control a biometric sensor and receive biometric data from the user via the sensor, to combine and encrypt the biometric data and password, to combine the user name with the encrypted biometric data and password to form a bundle and encrypt the bundle, and to communicate the first token to the network server computer and the bundle to the biometric authentication server.

The biometric authentication server creates a second token and determines whether the first token corresponds to the second token, determines whether the biometric data received from the client matches biometric data stored in a database, and determines whether the biometric data received from the client corresponds to the user name or the password.

The biometric authentication server communicates the user name and password received from the client computer to the network server computer if the first token corresponds to the second token, if the biometric data received from the client matches biometric data stored in a database, and if the biometric data received from the client corresponds to the user name or the password.

These and other important aspects of the present invention are described more fully in the detailed description below.

BRIEF DESCRIPTION OF THE DRAWINGS

An embodiment of the present invention is described in detail below with reference to the attached drawing figures, wherein.

DETAILED DESCRIPTION

Figure 1:
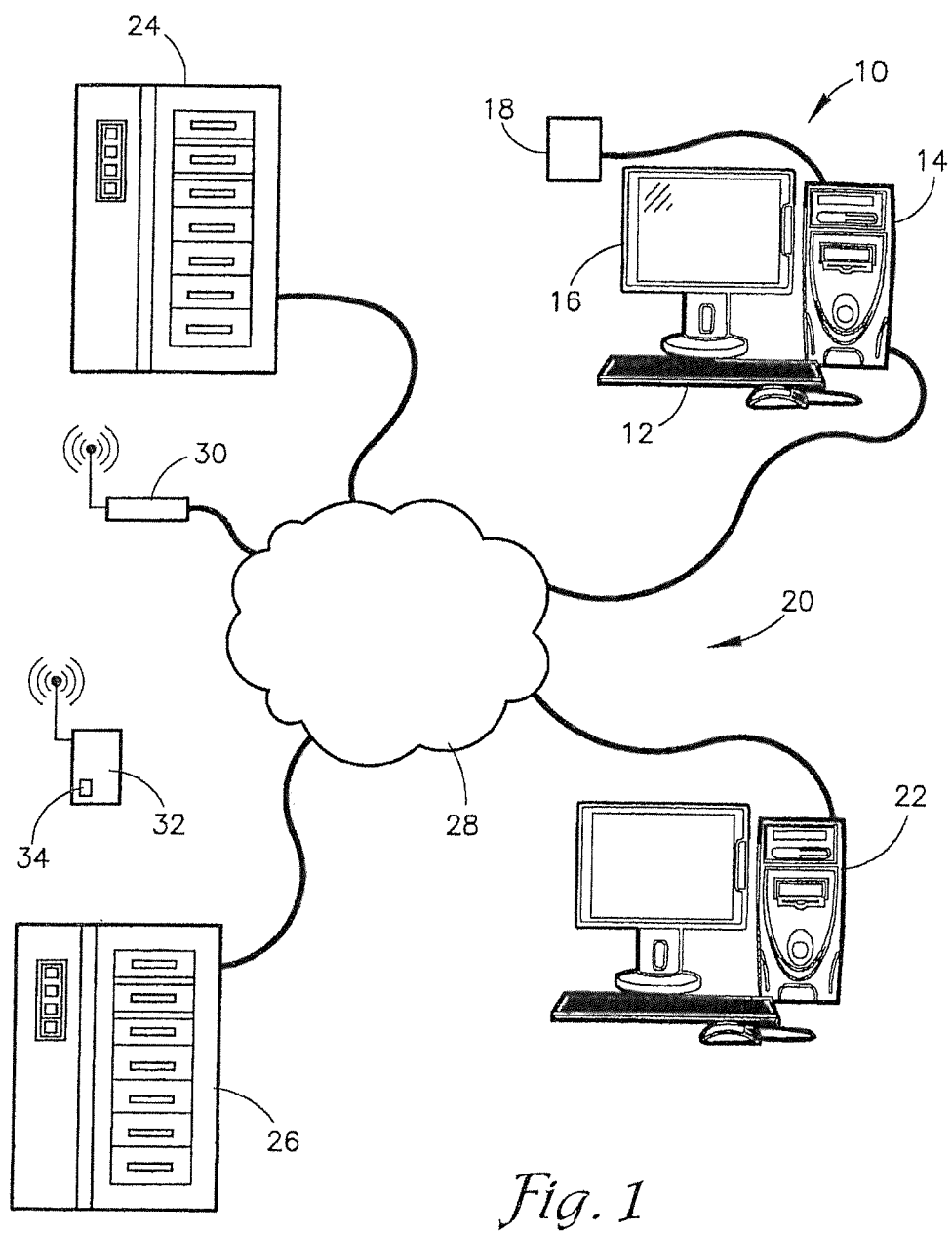
FIG. 1 is a schematic diagram of an exemplary system for implementing a computer program in accordance with an embodiment of the present invention.
Figure 4:
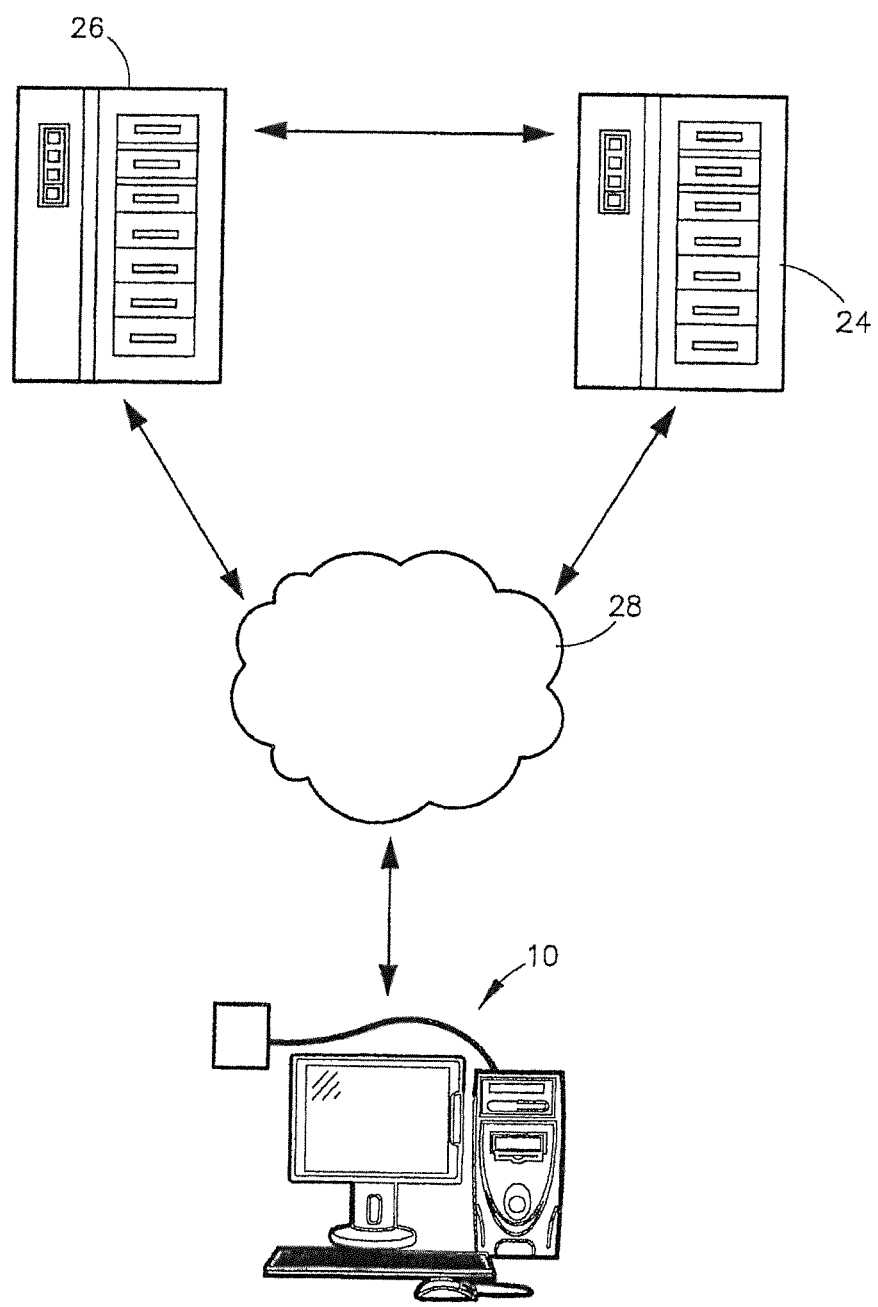
FIG. 4 is a schematic diagram of an exemplary communication scheme of the system of FIG. 1 involving a biometric authentication server, a third party server, and a client computer, wherein the biometric authentication server and the third party server are on a first side of a firewall and communicate via the Internet with the client which is on a second side of the firewall.

The present invention relates to a system and method of enhancing network security by providing transparent biometric authentication for network transactions. The method of the present invention is especially well-suited for implementation on a computer or computer network, such as the computer 10 illustrated in FIG. 1 that includes a keyboard 12, a processor console 14, a display 16, and one or more peripheral devices 18, such as a scanner or printer. The computer 10 may be a part of a computer network, such as the computer network 20 that includes one or more client computers 10,22 and one or more server computers 24,26 interconnected via a communications system 28. The communications system 28 may include, for example, a local area network, wide area network, the Internet, or a combination thereof. As illustrated in FIG. 4, the servers 24 and 26 may be connected to a local area network or other local communication means residing on a first side of a firewall and communicate with the client computer 10 residing on a second side of the firewall via the Internet 28.

The present invention may also be implemented, in whole or in part, on a wireless communications system including, for example, a network-based wireless transmitter 30 and one or more wireless receiving devices, such as a hand-held computing device 32 with wireless communication capabilities, wherein the device 32 is a client of the network 20 and includes a peripheral element 34. The present invention will thus be generally described herein as a computer program. It will be appreciated, however, that the principles of the present invention are useful independently of a particular implementation or embodiment, and that one or more of the steps described herein may be implemented without the assistance of a computing device.

The present invention can be implemented in hardware, software, firmware, or a combination thereof. In a preferred embodiment, however, the invention is implemented with a computer program. The computer program and equipment described herein are merely examples of a program and equipment that may be used to implement the present invention and may be replaced with other software and computer equipment without departing from the scope of the present invention.

The computer program of the present invention is stored in or on a computer-usable medium, such as a computer-readable medium, residing on or accessible by a host computer or a plurality of host computers for instructing the host computer or computers to implement the method of the present invention as described herein. The host computer may be a server computer, such as server computer 24, or a network client computer, such as computer 10 or device 32. The computer program preferably comprises an ordered listing of executable instructions for implementing logical functions in the host computer and other computing devices coupled with the host computer. The computer program can be embodied in any computer-usable medium for use by or in connection with an instruction execution system, apparatus, or device, such as a computer-based system, processor-containing system, or other system that can fetch the instructions from the instruction execution system, apparatus, or device, and execute the instructions.

The ordered listing of executable instructions comprising the computer program of the present invention will hereinafter be referred to simply as "the program" or "the computer program." It will be understood by those skilled in the art that the program may comprise a single list of executable instructions or two or more separate lists, and may be stored on a single computer-readable medium or multiple distinct media, including multiple geographically separate media. The program will also be described as comprising various "code segments," which may include one or more lists, or portions of lists, of executable instructions. Code segments may include overlapping lists of executable instructions, that is, a first code segment may include instruction lists A and B, and a second code segment may include instruction lists B and C.

In the context of this document, a "computer-usable medium" can be any means that can contain, store, communicate, propagate or transport the program for use by or in connection with the instruction execution system, apparatus, or device. The computer-usable medium can be, for example, but is not limited to, an electronic, magnetic, optical, electro-magnetic, infrared, or semi-conductor system, apparatus, device, or propagation medium. More specific, although not inclusive, examples of the computer-usable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-usable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

In the context of this document, an "object" is a selfcontained software entity that consists of both data and procedures to manipulate the data.

In a first embodiment, the present invention enables enhanced, transparent network security between a network client computer 10 and a third party network server 24 by employing a biometric identification server 26. The client computer 10 may be substantially any convention personal computer or computer workstation with access to the network 20, such as, for example, where the network 20 is the Internet. Thus, the client computer 10 may be in a user's home, office, vehicle or another location. The client computer 10 includes a biometric sensor 18 operable to capture the user's biometric data, such as fingerprint data. In the first embodiment the biometric sensor 18 is a fingerprint scanner for capturing fingerprint data, but it will be appreciated that substantially any biometric data may be used without departing from the scope of the claimed invention including, but not limited to, voice print data, retinal scan data, iris scan data, facial characteristics, and behavioral characteristics, such as signature data, captured and analyzed using conventional hardware and processes known in the art. Furthermore, the biometric data used by the claimed invention may be any combination of one or more types of such biometric data.

The third party network server 24 is a device or system that manages network resources, such as network traffic or network storage devices dedicated to storing data files, and may be a conventional network server computer or server station. More specifically, the third party network server 24 may be a World Wide Web server hosting a web page or a web site, wherein the server 24 requires user identification before granting access to the web page or web site. The third party network server 24 may be implemented independently of the client computer 10 and by a third party not associated with the client computer 10.

The biometric authentication server 26 may be similar to the third party network server 24, but is operable to perform a particular function. The biometric authentication server 26 is operable to store and manage user identification information and user biometric information, such where the identification information and the biometric information are stored in a database that is accessible by, or resides on, the server 26. As explained above, the communications system 28 provides a medium through which the client computer 10, the third party server 24, and the biometric authentication server 26 communicate via any of various network communications protocols.

Figure 2:
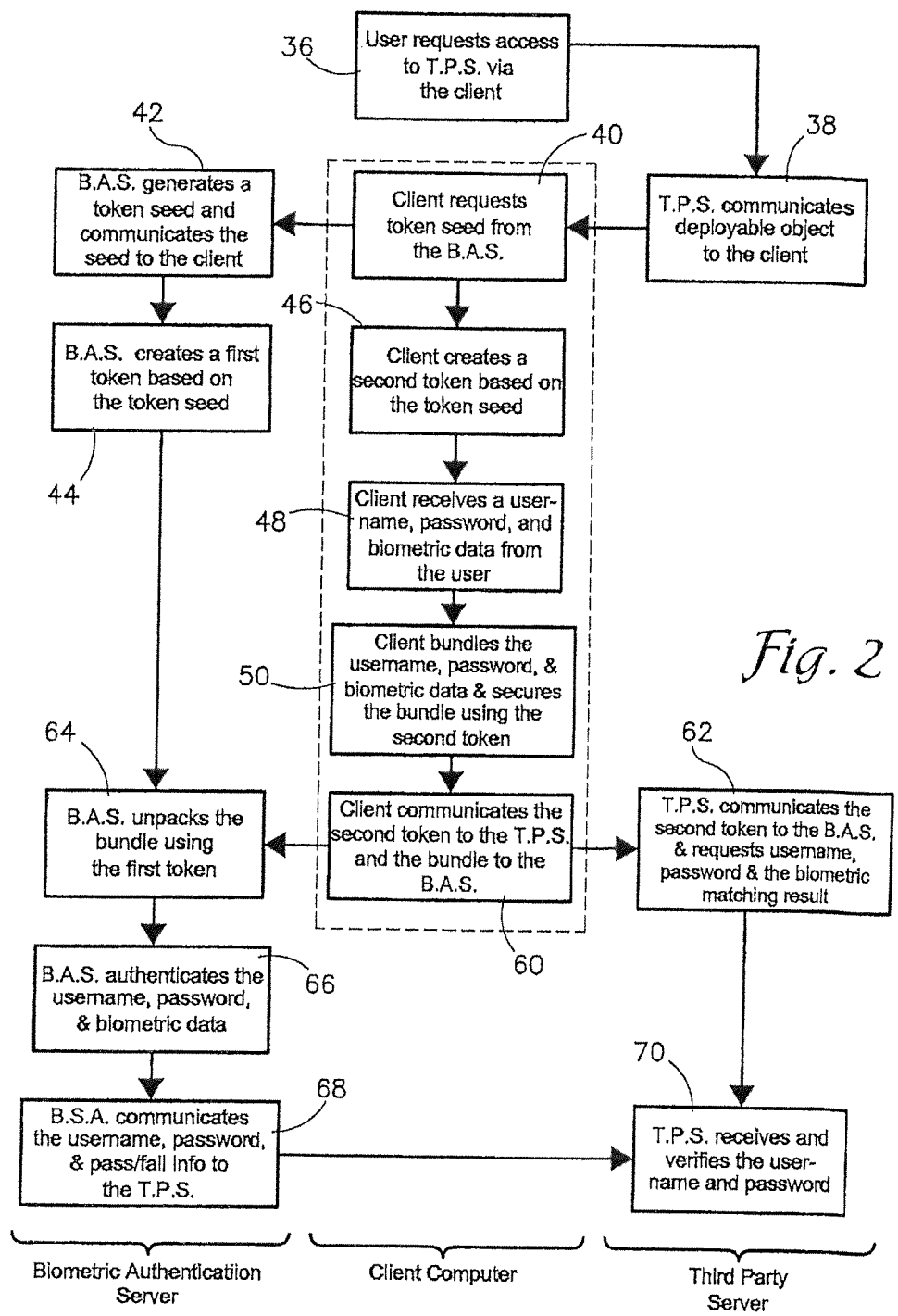
FIG. 2 is a flow diagram of certain steps performed by the computer program for providing transparent biometric authentication for network-based transactions.

Referring also to FIG. 2, a flow diagram of exemplary steps involved in the first embodiment of the present invention is illustrated. The steps illustrated in FIG. 2 need not be executed in precisely the order shown, but a second step illustrated subsequent to a first step may be executed concurrently with, or in some cased prior to, the first step. The steps are divided into three columns, wherein a left column generally includes steps performed by the biometric authentication server 26, the middle column generally includes steps performed by the client computer 10, and the right column generally includes steps performed by the third party server 24.

First, a user requests access to the third-party server 24 via the client computer 10, as depicted in block 36. This step may occur, for example, when the user desires to engage in online banking and requests or selects a login page from the bank's web site via a web browser running on the client computer 10, wherein the third party server 24 requires a valid user name and password to grant access to the web site. It will be appreciated that this scenario is only exemplary in nature and that the third-party server 24 need not be associated with a bank, but may be associated with any business, organization, group, association, or other entity. Furthermore, the user name and password discussed herein are exemplary types of user identification information required by the third party server 24 before granting access to the user. Alternatively, the third party server 24 may require only the user name, only the password, or an entirely different form of identification, such as a digital certificate in the form of a data file stored on the client computer 10.

Unless otherwise noted, communications between the client computer 10, the third party server 24, and the biometric authentication server 26 are encrypted or otherwise secured to prevent unintended recipients from opening, reading, or otherwise using communicated data and information.

When the user requests the login page from the third-party server 24 via the client computer 10, the third party server 24 communicates a deployable object to the client computer 10, as depicted in block 38. The deployable object is a software object that is generated by, resides on, or is retrieved by the third-party server 24, and is executed by the client computer 10 upon receipt thereof from the third party server 24 without the need for the client computer user to perform any installation or initiation steps. In other words, the client computer 10 receives and executes the deployable object transparently to the user. The object is "deployable" in that it can be communicated from a first computer to a second computer for execution on the second computer, wherein the object has access to the system resources of the second computer necessary to allow the object to perform all functions contained therein.

The client computer 10 executes the deployable object, which enables the client computer 10 to request a token seed from the biometric authentication server 26, as illustrated in block 40. The token seed serves as a basis to generate multiple identical tokens that are used as encryption and decryption keys as well as to associate a plurality of events or items with a single transaction. Thus, the tokens serve as transaction identifiers to enable the biometric authentication server 26 to associate a communication from the third party server 24 with a communication from the client computer 10. This is particularly important where the biometric authentication server 26 is communicating with multiple external computers regarding multiple transactions. The biometric authentication server generates a token seed and communicates the token seed to the client computer 10, as depicted in block 42, and creates a first token from the token seed, as depicted in block 44. The first token is retained by the biometric authentication server 26 to decrypt communications received from the client computer 10 and to associate communications from the third party server 24 and the biometric authentication server 26 with a single transaction.

A preferred deployable object is an ActiveX object, such as an ActiveX control, wherein the ActiveX control is communicated from the third party server 24 to the client computer 10 via a web browser running on the client computer 10, wherein the ActiveX control can access system resources of the network client computer 10 but is extinguished from the client computer 10 when the web browser is terminated or is no longer in communication with the third party server 24.

When the client computer 10 executes the deployable object, the object enables the client 10 to create a second token based on the token seed, as depicted in block 46. The second token is identical to the first token or is otherwise associated with the first token such that when the biometric authentication server 26 receives the second token it can associate the first token with the second token.

The deployable object enables the client computer 10 to receive a username, password, and biometric data from the user, as depicted in block 48. In this step, the client computer 10 presents a user login page that prompts the user to submit a username and password in respective username and password fields. The user login page would also prompt the user to submit biometric data, such as fingerprint data via a fingerprint scanner. To enable the client computer 10 to receive biometric data from the user, the deployable object controls the biometric sensor 18 and provides a bridge between the biometric sensor 18 and the user interface of the client computer 10. The deployable object may interact, for example, with a dynamically linked library associated with the biometric sensor 18 wherein the library provides executable functions and data necessary for the deployable object to communicate with and control the biometric sensor 18.

Enabling the deployable object to communicate with and control the biometric sensor 18 reduces the risk of a person circumventing the biometric scanner 18 because the deployable object can ensure that biometric data is received from the biometric sensor 18 at the time the user submits the user name and password.

Figure 3:
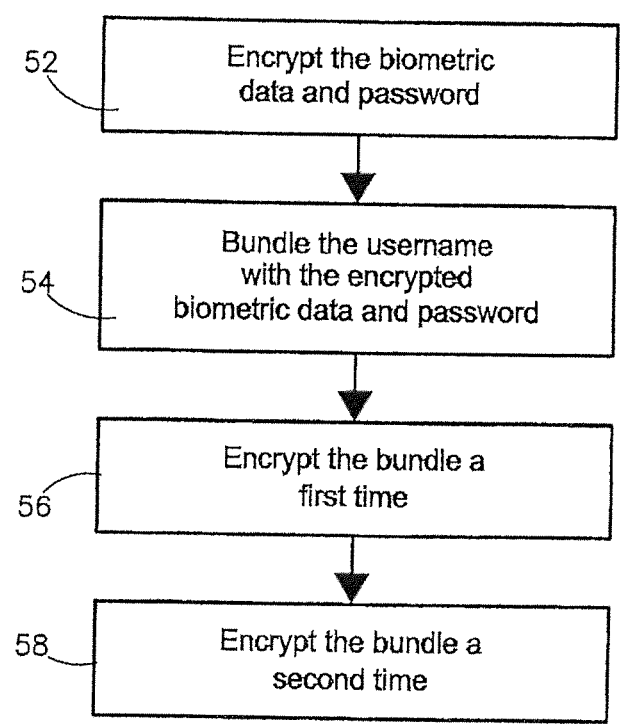
FIG. 3 is a flow diagram of certain steps performed by the computer program for bundling and securing identification and biometric information for communication in a network-based transaction.

The deployable object enables the client computer 10 to bundle the user name, password, and biometric data together and secure the bundle, as depicted in block 50. A flowchart of steps illustrating an exemplary method of bundling the user name, password, and biometric data is illustrated in FIG. 3. First, the client computer 10 encrypts the biometric data and the password using the second token, as depicted in block 52. The client computer 10 may combine the biometric data and the password prior to encryption, wherein such combination may include, for example, merging the fingerprint data and the password into a single file, or creating a file for each of the fingerprint data and the password and placing the two files into a single folder. The client computer 10 then bundles the username with the encrypted biometric data and password, as depicted in block 54. The client computer 10 encrypts the bundle using the second token as an encryption key, as depicted in block 58, and encrypts the bundle a second time using the second token as an encryption key, as depicted in block 60.

Thus, the exemplary method of bundling and securing the user name, password, and biometric data comprises a multi-tiered encryption scheme involving three levels of encryption. It should also be noted that more sensitive data may be encrypted in a deeper layer than less sensitive data. The biometric data and the password may be considered more sensitive than the user name, for example, because the biometric data is unique to the user and cannot change, and the password may reflect passwords employed by the user in other systems or situations.

Referring again to FIG. 2, once the client computer 10 has bundled the user name, password, and biometric data, the deployable object enables the client computer 10 to communicate the bundle to the biometric authentication server 26 and to communicate the second token to the third party server 24, as depicted in block 60. Blocks 40, 46, 48, 50, and 60, illustrated inside a broken-line box, represent steps performed by the client computer 10 enabled by the deployable object.

The third party server 24 communicates a copy of the second token to the biometric authentication server 26 and requests a user name and password corresponding to the second token, as depicted in block 62. Thus, the third party server 24 does not receive the user name and password directly from the client computer 10, but rather from the biometric authentication server 26, as explained below.

The biometric authentication server 26 unpacks the bundle received from the client 10 using the first token, as depicted in block 64. Unpacking the bundle is accomplished essentially by reversing the steps illustrated in FIG. 3. For example, the bundle is decrypted a first time and a second time to reveal the user name, and the encrypted biometric data and password. The user name is separated from the encrypted biometric data and password, and the encrypted biometric data and password are decrypted and separated. In contrast to the bundling process illustrated in FIG. 3, when the biometric authentication server 26 unpacks the bundle, it performs the decryption using the first token as a decryption key. Therefore, if the first token does not correspond to the second token, the decryption will fail.

The biometric authentication server 26 verifies the second token received from the third party server 24 by comparing it with the first token, which was created and retained by the biometric authentication server 26. Because both the first token and the second token were created from the same token seed, both tokens will be identical or otherwise have a known relationship that can be used to verify that both were created from the same token seed and thus pertain to the same transaction.

The biometric authentication server 26 authenticates the user name, password, and biometric data, as depicted in block 66. The received biometric data is authenticated by comparing it with biometric data stored in a database, wherein the received biometric data is authenticated if it matches biometric data stored in the database. The user name and password are authenticated if they match a user name and password that are stored in the database and associated with the biometric data stored in the database that matches the received biometric data. Alternatively, only a portion of the user identification information may be authenticated, such as only the user name, only the password, or a portion of either or both. If the user name, password, and biometric data are thus authenticated, the biometric authentication server 26 communicates the user name and the password to the third party server, as depicted in block 70. The third party server 24 receives and verifies the user name and password in a conventional manner, as depicted in block 72. This may involve, for example, comparing the user name and password to user names and passwords stored in a database and presenting the client computer 10 user with a home or welcome page. Alternatively, the biometric authentication server 26 may communicate only a portion of the identification information, such as only the user name or only the password, to the third party server 24.

In a second embodiment of the invention, the wireless device 32 communicates with the third party server 24 and the biometric authentication server 26 in addition to, or in place of, the client computer 10. This embodiment would otherwise be substantially similar to any of the other embodiments described herein, except that the device 32 would perform substantially all of the functions described above in relation to the client computer 10. The user would submit biometric data via the biometric sensor 34, for example, and would submit identification information via a conventional user interface (not shown) of the device 32 including, for example, a keypad, LCD, or similar user interface element or elements. In the second embodiment, the deployable object may need to be adapted for use with the wireless device 32, particularly if the device 32 is a handheld device or otherwise has limited resources.

A third embodiment of the invention is substantially similar to either the first or second embodiments, except that the software contained in the deployable object is installed in and resides upon the client computer 10, the client device 32, or both, instead of being communicated thereto upon the initiation of a transaction. In this embodiment, the program code executed by the client computer 10 may be installed on the client 10 prior to the user requesting access to the third party server 24 and may reside on the client 10 after each transaction. The third party server 24 would communicate only the token seed to the client computer 10, rather than the deployable object and the token seed.

In a fourth embodiment of the invention, the deployable object is stored on or is generated by the biometric authentication server 26, and is communicated from the biometric authentication server 26 directly to the client computer 10 or, alternatively, to the third party server 24, which in turn communicates the object to the client computer 10.

Although the invention has been described with reference to the preferred embodiments illustrated in the attached drawings, it is noted that equivalents may be employed and substitutions made herein without departing from the scope of the invention as recited in the claims. It will be appreciated, for example, that the client computer 10, the third party server 24, and the biometric authentication server 26 may be interconnected via any of various communication means including, for example, peer-to-peer communication protocols.

Having thus described a preferred embodiment of the invention, what is claimed as new and desired to be protected by Letters Patent includes the following:

The invention claimed is:

1. A non-transitory computer-readable storage medium with an executable program stored thereon for enabling authentication of a user at a third-party server, wherein at least one item of stored biometric identification information received from the user is stored so as to be accessible by at least an authentication server, wherein the computer program instructs one or more processors to perform steps of:
   receive, by a biometric sensor of a client computer and from the user, user biometric identification information;
   encrypt, by the client computer, the user biometric identification information to obtain encrypted user biometric identification information;
   transmit, by the client computer and to the authentication server, the encrypted user biometric identification information;
   transmit, by the client computer and to the third-party server, at least one item of user authentication information;
   decrypt, by the authentication server, the encrypted user biometric identification information;
   authenticate, by the authentication server, the user based on the stored biometric identification information to obtain an authenticated user;
   receive, by the authentication server and from the third-party server, the at least one item of user authentication information; and
   based on the received at least one item of user authentication information and the authenticated user, grant access to the user to the third-party server wherein the authentication server generates keying information,
      wherein the authentication server transmits the keying information to the client computer for deriving a key,
      wherein the user biometric identification information is encrypted using the key derived from the keying information transmitted by the authentication server.

2. The computer-readable storage medium of claim 1, wherein the client computer is a handheld device.

3. The computer-readable storage medium of claim 1,
   wherein the key used to encrypt the user biometric identification information is a first key, and
   wherein the user authentication information transmitted by the client computer to the third-party server is encrypted by or is a second key.

4. The computer-readable storage medium of claim 3, wherein the second key is derived from information provided by the authentication server, and such information is the same as the information used to derive the first key.

5. The computer-readable storage medium of claim 1, wherein the step of granting access to the user to the third-party server based on the received user authentication information and the authenticated user includes the step of confirming the user authentication information received by the authentication server and from the third-party server is derived from or includes the information provided by the authentication server and to the client computer.

6. The computer-readable storage medium of claim 1, wherein the step of authenticating the user based on the stored biometric identification information includes confirming the stored biometric identification information matches the decrypted user biometric identification information.

7. The computer-readable storage medium of claim 1, wherein the step of granting access to the user to the third-party server comprises granting access to the user to a particular resource associated with the third-party server.

* * * * *